United States Patent
Bizub

(10) Patent No.: US 9,791,343 B2
(45) Date of Patent: Oct. 17, 2017

(54) METHODS AND SYSTEMS TO DERIVE ENGINE COMPONENT HEALTH USING TOTAL HARMONIC DISTORTION IN A KNOCK SENSOR SIGNAL

(71) Applicant: General Electric Company, Schenectady, NY (US)

(72) Inventor: Jeffrey Jacob Bizub, Milwaukee, WI (US)

(73) Assignee: General Electric Company, Schenectady, NY (US)

( * ) Notice: Subject to any disclaimer, the term of this patent is extended or adjusted under 35 U.S.C. 154(b) by 316 days.

(21) Appl. No.: 14/621,028

(22) Filed: Feb. 12, 2015

(65) Prior Publication Data
US 2016/0238478 A1    Aug. 18, 2016

(51) Int. Cl.
| | | |
|---|---|---|
| G01L 23/22 | (2006.01) | |
| G01M 7/00 | (2006.01) | |
| G01M 15/12 | (2006.01) | |
| F02D 35/02 | (2006.01) | |
| F02F 3/00 | (2006.01) | |
| F04B 51/00 | (2006.01) | |
| F04B 53/14 | (2006.01) | |

(52) U.S. Cl.
CPC .......... *G01L 23/225* (2013.01); *F02D 35/027* (2013.01); *F02F 3/00* (2013.01); *F04B 51/00* (2013.01); *F04B 53/14* (2013.01); *G01L 23/227* (2013.01); *G01M 7/00* (2013.01); *G01M 15/12* (2013.01)

(58) Field of Classification Search
CPC .......... F02D 35/027; F02F 3/00; F04B 51/00; F04B 53/14; G01L 23/225; G01L 23/227; G01M 15/12; G01M 7/00
See application file for complete search history.

(56) References Cited

U.S. PATENT DOCUMENTS

| | | |
|---|---|---|
| 5,029,565 A | 7/1991 | Talbot |
| 5,111,790 A | 5/1992 | Grandy |
| 5,115,778 A | 5/1992 | Holroyd |
| 5,119,783 A | 6/1992 | Komurasaki |
| 5,241,480 A | 8/1993 | Takaku et al. |
| 5,257,533 A | 11/1993 | Imada |
| 5,337,240 A | 8/1994 | Nakagawa et al. |
| 5,339,245 A | 8/1994 | Hirata et al. |

(Continued)

FOREIGN PATENT DOCUMENTS

| | | |
|---|---|---|
| CN | 203480037 | 3/2014 |
| DE | 102012204086 A1 | 9/2013 |

(Continued)

OTHER PUBLICATIONS

Vanlanduit et al., "An On-Line Combined Linear-Nonlinear Fatigue Crack Detection Technique", NDT & E International, vol. No. 37, Issue No. 01, pp. 41-45, Jan. 2004.

(Continued)

*Primary Examiner* — Freddie Kirkland, III
(74) *Attorney, Agent, or Firm* — Fletcher Yoder P.C.

(57) ABSTRACT

A method of deriving reciprocating device component health includes receiving a signal from a knock sensor coupled to a reciprocating device, deriving total harmonic distortion (THD) at one or more frequencies, and determining whether the derived THD exceeds a threshold value.

19 Claims, 6 Drawing Sheets

(56) References Cited

U.S. PATENT DOCUMENTS

| | | | |
|---|---|---|---|
| 5,361,213 A | 11/1994 | Fujieda et al. | |
| 5,392,642 A | 2/1995 | Tao | |
| 5,400,648 A | 3/1995 | Mahr | |
| 5,452,699 A | 9/1995 | Rossignol | |
| 5,467,638 A | 11/1995 | Philipp | |
| 5,594,649 A | 1/1997 | Cook et al. | |
| 5,693,936 A | 12/1997 | Komachiya et al. | |
| 5,763,769 A | 6/1998 | Kluzner | |
| 5,837,887 A | 11/1998 | Shibata et al. | |
| 5,905,193 A | 5/1999 | Hashizume et al. | |
| 5,932,801 A | 8/1999 | Akishita et al. | |
| 5,934,256 A | 8/1999 | Wenzlawski et al. | |
| 5,996,398 A | 12/1999 | Schleupen et al. | |
| 6,104,195 A | 8/2000 | Yoshinaga et al. | |
| 6,273,064 B1 | 8/2001 | Scholl et al. | |
| 6,276,334 B1 | 8/2001 | Flynn et al. | |
| 6,330,877 B1 | 12/2001 | Nordin | |
| 6,336,355 B1 | 1/2002 | Sasaki et al. | |
| 6,550,311 B2 | 4/2003 | Sloboda | |
| 6,598,468 B2 | 7/2003 | Zur Loye et al. | |
| 6,662,781 B1 | 12/2003 | Torno et al. | |
| 6,814,054 B2 | 11/2004 | Sauler et al. | |
| 6,862,517 B2 | 3/2005 | Galtier | |
| 6,885,932 B2 | 4/2005 | Liu et al. | |
| 6,912,460 B2 | 6/2005 | Sauler et al. | |
| 6,947,829 B2 | 9/2005 | Honda | |
| 6,978,771 B2 | 12/2005 | Kuzuyama et al. | |
| 6,990,947 B2 | 1/2006 | Kuzuyama et al. | |
| 7,021,128 B2 | 4/2006 | Rauchfuss et al. | |
| 7,027,909 B2 | 4/2006 | deBotton et al. | |
| 7,181,338 B2 | 2/2007 | Takemura et al. | |
| 7,191,658 B2 | 3/2007 | Oda et al. | |
| 7,212,909 B2 | 5/2007 | Yoshino et | |
| 7,243,529 B2 | 7/2007 | Takemura et al. | |
| 7,246,600 B2 | 7/2007 | Nakashima et al. | |
| 7,260,469 B2 | 8/2007 | Birk et al. | |
| 7,263,872 B2 | 9/2007 | Danet et al. | |
| 7,275,003 B2 * | 9/2007 | Koh | H02P 29/02 324/522 |
| 7,310,993 B2 | 12/2007 | Popielas et al. | |
| 7,325,529 B2 | 2/2008 | Ancimer et al. | |
| 7,356,404 B2 | 4/2008 | Takemura et al. | |
| 7,376,506 B2 | 5/2008 | Schueler | |
| 7,383,816 B2 | 6/2008 | Zurlo | |
| 7,444,231 B2 | 10/2008 | Ancimer et al. | |
| 7,444,236 B2 | 10/2008 | Wiles | |
| 7,448,254 B2 * | 11/2008 | Kurtz | G01L 23/221 73/35.13 |
| 7,546,198 B2 | 6/2009 | Remelman | |
| 7,559,230 B2 | 7/2009 | Zimmer | |
| 7,571,640 B2 | 8/2009 | Andrews | |
| 7,628,253 B2 | 12/2009 | Jin et al. | |
| 7,669,582 B2 | 3/2010 | Kaneko et al. | |
| 7,712,450 B2 | 5/2010 | Sato et al. | |
| 7,747,380 B2 | 6/2010 | Chauvin et al. | |
| 7,810,469 B2 | 10/2010 | Vigild et al. | |
| 7,823,561 B2 | 11/2010 | Omuro et al. | |
| 8,000,884 B2 | 8/2011 | Aso et al. | |
| 8,032,293 B2 | 10/2011 | Binder et al. | |
| 8,068,972 B2 | 11/2011 | Auclair et al. | |
| 8,078,389 B2 | 12/2011 | Huang et al. | |
| 8,079,261 B2 | 12/2011 | Crickmore et al. | |
| 8,108,131 B2 | 1/2012 | Huang et al. | |
| 8,155,857 B2 | 4/2012 | Loeffler et al. | |
| 8,250,905 B2 | 8/2012 | Schneider et al. | |
| 8,260,531 B2 | 9/2012 | Yasuda | |
| 8,316,824 B2 | 11/2012 | Hagari et al. | |
| 8,342,011 B2 | 1/2013 | Galtier et al. | |
| 8,359,909 B2 | 1/2013 | Duval et al. | |
| 8,396,649 B2 | 3/2013 | Huang | |
| 8,463,533 B2 | 6/2013 | Glugla et al. | |
| 8,499,623 B2 | 8/2013 | Duval et al. | |
| 8,528,521 B2 | 9/2013 | Landsmann et al. | |
| 8,538,666 B2 | 9/2013 | Buslepp et al. | |
| 8,606,484 B2 | 12/2013 | Ohata | |
| 8,627,800 B2 | 1/2014 | Glugla et al. | |
| 8,639,432 B2 | 1/2014 | Matsuo et al. | |
| 8,677,975 B2 | 3/2014 | Auclair et al. | |
| 8,680,707 B2 | 3/2014 | Childs et al. | |
| 8,849,471 B2 | 9/2014 | Daniel et al. | |
| 9,435,644 B2 * | 9/2016 | Kamata | G01V 1/184 |
| 9,459,088 B2 * | 10/2016 | Ottewill | G01R 31/343 |
| 2006/0284675 A1 | 12/2006 | Krochmal et al. | |
| 2009/0048729 A1 | 2/2009 | Waters et al. | |
| 2011/0132327 A1 * | 6/2011 | Aso | F01L 1/185 123/436 |
| 2011/0166766 A1 * | 7/2011 | Panciroli | F02D 35/02 701/102 |
| 2011/0290024 A1 * | 12/2011 | Lefler | G01H 1/003 73/579 |
| 2016/0138998 A1 * | 5/2016 | Zheng | G01H 3/08 73/579 |

FOREIGN PATENT DOCUMENTS

| | | |
|---|---|---|
| DE | 102012021985 A1 | 5/2014 |
| EP | 1184672 A1 | 3/2002 |
| EP | 1447654 | 8/2004 |
| EP | 1698775 | 6/2006 |
| EP | 1840360 | 3/2007 |
| EP | 1988378 | 5/2008 |
| EP | 2128409 | 2/2009 |
| EP | 2128410 | 2/2009 |
| EP | 2433355 | 3/2012 |
| EP | 2500705 | 9/2012 |
| WO | WO2008000568 | 1/2008 |
| WO | WO2008059376 | 5/2008 |
| WO | WO2009106557 | 9/2009 |
| WO | WO2013015372 | 1/2013 |
| WO | WO2013026950 | 2/2013 |
| WO | WO2013118151 | 8/2013 |

OTHER PUBLICATIONS

Sreekumar et al.,"Compact Fiber Bragg Grating Dynamic Strain Sensor Cum Broadband Thermometer for Thermally Unstable Ambience", Journal of Optics, vol. No. 12, Issue No. 01, pp. 15502, Jan. 1, 2010.

Maas et al., "Damage Assessment of Concrete Structures Through Dynamic Testing Methods. Part 1 : Laboratory Test", Engineering Structures , vol. No. 34, pp. 351-362, Sep. 1, 2011.

Maas et al., "Damage Assessment of Concrete Structures through Dynamic Testing Methods. Part 2 : Bridge test", Engineering structures, vol. No. 34, pp. 483-494, Sep. 1, 2011.

European Search Report and Opinion Issued in connection with corresponding EP Application No. 16154444.0 on Jul. 5, 2016.

U.S. Appl. No. 14/614,237, filed Feb. 4, 2015, Pin Zeng.
U.S. Appl. No. 14/617,458, filed Feb. 9, 2015, Jeffrey Jacob Bizub.
U.S. Appl. No. 14/621,028, filed Feb. 15, 2015, Jeffrey Jacob Bizub.
U.S. Appl. No. 14/626,385, filed Feb. 19, 2015, Jeffrey Jacob Bizub.
U.S. Appl. No. 14/639,736, filed Mar. 5, 2015, Jeffrey Jacob Bizub.
U.S. Appl. No. 14/644,526, filed Mar. 11, 2015, Jeffrey Jacob Bizub.
U.S. Appl. No. 14/657,817, filed Mar. 13, 2015, Jeffrey Jacob Bizub.
U.S. Appl. No. 14/676,733, filed Apr. 1, 2015, Jeffrey Jacob Bizub.
U.S. Appl. No. 14/686,350, filed Apr. 14, 2015, Maruthi Narasinga Rao Devarakonda.
U.S. Appl. No. 14/695,335, filed Apr. 24, 2015, Jeffrey Jacob Bizub.
U.S. Appl. No. 14/705,081, filed May 6, 2015, Scott K. Mann.
U.S. Appl. No. 14/745,986, filed Jun. 22, 2015, Sandro Rivellini.
U.S. Appl. No. 14/754,128, filed Jun. 29, 2015, Jeffrey Jacob Bizub.
U.S. Appl. No. 14/790,785, filed Jul. 2, 2015, Pavan Chakravarthy Nandigama.
U.S. Appl. No. 14/796,934, filed Jul. 10, 2015, Jeffrey Jacob Bizub.
U.S. Appl. No. 14/820,156, filed Aug. 6, 2015, Jeffrey Jacob Bizub.
U.S. Appl. No. 14/918,013, filed Oct. 20, 2015, Venkatesh Raman.
U.S. Appl. No. 14/320,101, filed Jun. 30, 2014, Ryan Thomas Smith.
U.S. Appl. No. 14/587,407, filed Dec. 31, 2014, Jeffrey Jacob Bizub.
U.S. Appl. No. 14/587,412, filed Dec. 31, 2014, Jerry Jacob Bizub.

(56) References Cited

OTHER PUBLICATIONS

U.S. Appl. No. 14/587,434, filed Dec. 31, 2014, Jeffrey Jacob Bizub.
U.S. Appl. No. 14/591,192, filed Jan. 7, 2015, Jeffrey Jacob Bizub.
U.S. Appl. No. 14/592,547, filed Jan. 8, 2015, Jeffrey Jacob Bizub.
U.S. Appl. No. 14/600,674, filed Jan. 20, 2015, Scott K. Mann.
U.S. Appl. No. 14/609,416, filed Jan. 29, 2015, Jeffrey Jacob Bizub.
Reduction Piston Slap Excitation by Optimizing Piston Profiles; Takayuki Koizumi et al,; Proc. of 2002 IMAC-XX: Conf. & Exposition on Structural Dynamics, Jun. 12-15, 2000.
VE Piston Dynamics; FEV Group, Inc.; available online; www.fev.com/what-we-do/software/virtual-engine-powertrain-dynamics-simulation/piston-dynamics-module; Jan. 1, 2015.
Diagnostic Internal Combustion Engine Based on Crankshaft Angular Acceleration; Binh Le Khac, Tuma J.; available online; www.researchgate.net, May 2012.
Bolt loosening detection using vibration characteristics of thin plate with piezoelectric elements;Takeshi Nakahara et al; Proc.of SPIE 5391, Smart Struc. & Materials, Jul. 2004.

* cited by examiner

METHODS AND SYSTEMS TO DERIVE ENGINE COMPONENT HEALTH USING TOTAL HARMONIC DISTORTION IN A KNOCK SENSOR SIGNAL

BACKGROUND

The subject matter disclosed herein relates to knock sensors, and more specifically, to knock sensors mounted to large, multi-cylinder reciprocating devices (e.g., combustion engines, reciprocating compressors, etc.) for component condition detection.

Combustion engines typically combust a carbonaceous fuel, such as natural gas, gasoline, diesel, and the like, and use the corresponding expansion of high temperature and pressure gases to apply a force to certain components of the engine, e.g., piston disposed in a cylinder, to move the components over a distance. Each cylinder may include one or more valves that open and close correlative with combustion of the carbonaceous fuel. For example, an intake valve may direct an oxidizer such as air into the cylinder, which is then mixed with fuel and combusted. Combustion fluids, e.g., hot gases, may then be directed to exit the cylinder via an exhaust valve. Accordingly, the carbonaceous fuel is transformed into mechanical motion, useful in driving a load. For example, the load may be a generator that produces electric power. Knock sensors can be used to monitor multi-cylinder combustion engines. A knock sensor can be mounted to the exterior of an engine cylinder and used to determine whether or not the engine is running as desired.

Component failure that takes place while an engine is running can be costly and cause damage to the engine far exceeding the component that fails. As such, it would be beneficial to have a way to detect that a component is worn out, or otherwise nearing failure, so the component can be replaced or repaired before the component fails while the engine is running.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a method of deriving reciprocating device component health includes receiving a signal from a knock sensor coupled to a reciprocating device, deriving total harmonic distortion (THD) at one or more frequencies, and determining whether the derived THD exceeds a threshold value.

In a second embodiment, a system includes a reciprocating device controller configured to control a reciprocating device, the reciprocating device controller includes a processor configured to obtain one or more fundamental frequencies, wherein each of the one or more frequencies corresponds to the fundamental frequency of a reciprocating device component, receive a signal from a knock sensor coupled to a reciprocating device, derive total harmonic distortion (THD) at the one or more frequencies, and determine whether the derived THD exceeds a threshold value.

In a third embodiment, a non-transitory computer readable medium includes executable instructions that when executed cause a processor to obtain one or more frequencies of one or more engine components, wherein each of the one or more frequencies corresponds to the fundamental frequency of a reciprocating device component, receive a signal from a knock sensor coupled to a reciprocating device, derive total harmonic distortion (THD) at the one or more frequencies, determine whether the derived THD exceeds a threshold value, and provide a user perceptible indication of the presence of distortion.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Component failure while a reciprocating device (e.g., combustion engine, reciprocating compressor, etc.) is running can cause costly damage to an engine, the scope of which may far exceed the failing part. As such, it would be beneficial to have a way to detect that a component is worn out, or otherwise near failure, before failure occurs, so the component can be replaced or repaired without causing unnecessary damage to the reciprocating device. Each component in an engine has a fundamental frequency. During operation of the reciprocating device, the resonance of a healthy component is dominated by resonance at the fundamental frequency. As the part wears and/or nears failure, the resonance of harmonics of the fundamental frequency increase, resulting in distortion. Because resonance of a component can be sensed by a knock sensor, the health of a reciprocating device component may be determined by monitoring the total harmonic distortion in the knock sensor signal.

Figure 1:
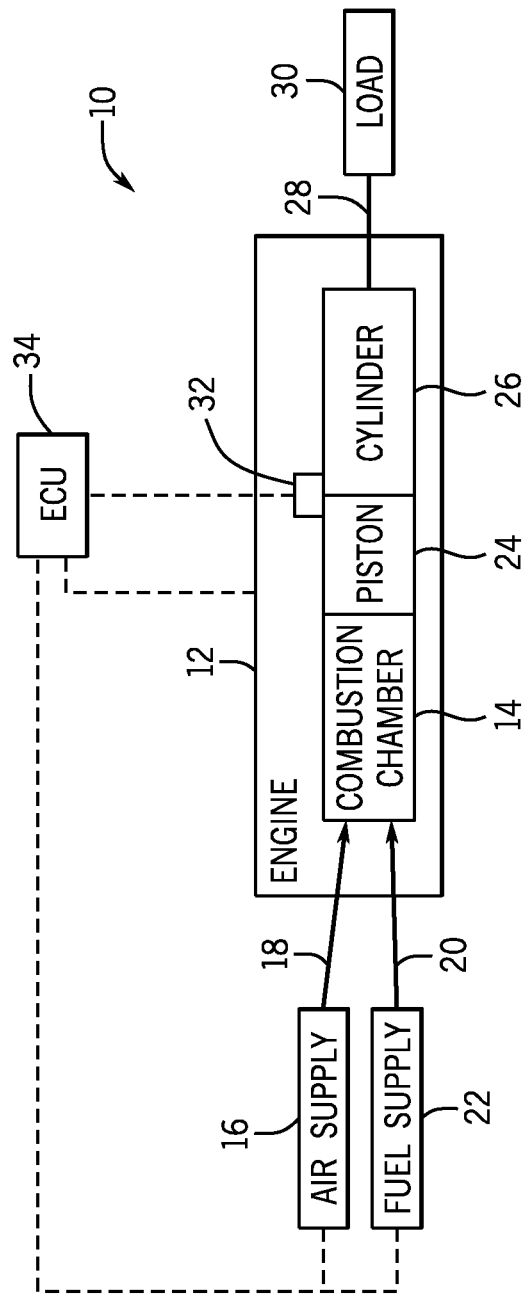
FIG. 1 is a block diagram of an embodiment of an engine driven power generation system in accordance with aspects of the present disclosure.

Turning to the drawings, FIG. 1 illustrates a block diagram of an embodiment of a portion of an engine driven power generation system 10. As described in detail below, the system 10 includes an engine 12 (e.g., a reciprocating internal combustion engine) having one or more combustion chambers 14 (e.g., 1, 2, 3, 4, 5, 6, 7, 8, 10, 12, 14, 16, 18, 20, or more combustion chambers 14). Though FIG. 1 shows a combustion engine 12, it should be understood that any reciprocating device may be used. An air supply 16 is configured to provide a pressurized oxidant 18, such as air, oxygen, oxygen-enriched air, oxygen-reduced air, or any combination thereof, to each combustion chamber 14. The combustion chamber 14 is also configured to receive a fuel 20 (e.g., a liquid and/or gaseous fuel) from a fuel supply 22, and a fuel-air mixture ignites and combusts within each combustion chamber 14. The hot pressurized combustion gases cause a piston 24 adjacent to each combustion chamber 14 to move linearly within a cylinder 26 and convert pressure exerted by the gases into a rotating motion, which causes a shaft 28 to rotate. Further, the shaft 28 may be coupled to a load 30, which is powered via rotation of the shaft 28. For example, the load 30 may be any suitable device that may generate power via the rotational output of the system 10, such as an electrical generator. Additionally, although the following discussion refers to air as the oxidant 18, any suitable oxidant may be used with the disclosed embodiments. Similarly, the fuel 20 may be any suitable gaseous fuel, such as natural gas, associated petroleum gas, propane, biogas, sewage gas, landfill gas, coal mine gas, for example.

The system 10 disclosed herein may be adapted for use in stationary applications (e.g., in industrial power generating engines) or in mobile applications (e.g., in cars or aircraft). The engine 12 may be a two-stroke engine, three-stroke engine, four-stroke engine, five-stroke engine, or six-stroke engine. The engine 12 may also include any number of combustion chambers 14, pistons 24, and associated cylinders (e.g., 1-24). For example, in certain embodiments, the system 10 may include a large-scale industrial reciprocating engine having 4, 6, 8, 10, 16, 24 or more pistons 24 reciprocating in cylinders 26. In some such cases, the cylinders and/or the pistons 24 may have a diameter of between approximately 13.5-34 centimeters (cm). In some embodiments, the cylinders and/or the pistons 24 may have a diameter of between approximately 10-40 cm, 15-25 cm, or about 15 cm. The system 10 may generate power ranging from 10 kW to 10 MW. In some embodiments, the engine 12 may operate at less than approximately 1800 revolutions per minute (RPM). In some embodiments, the engine 12 may operate at less than approximately 2000 RPM, 1900 RPM, 1700 RPM, 1600 RPM, 1500 RPM, 1400 RPM, 1300 RPM, 1200 RPM, 1000 RPM, 900 RPM, or 750 RPM. In some embodiments, the engine 12 may operate between approximately 750-2000 RPM, 900-1800 RPM, or 1000-1600 RPM. In some embodiments, the engine 12 may operate at approximately 1800 RPM, 1500 RPM, 1200 RPM, 1000 RPM, or 900 RPM. Exemplary engines 12 may include General Electric Company's Jenbacher Engines (e.g., Jenbacher Type 2, Type 3, Type 4, Type 6 or J920 FleXtra) or Waukesha Engines (e.g., Waukesha VGF, VHP, APG, 275GL), for example.

The driven power generation system 10 may include one or more knock sensors 32 suitable for detecting engine "knock" and/or other run characteristics of the engine 12. The knock sensor 32 may be any sensor configured to sense vibrations caused by the engine 12, such as vibration due to detonation, pre-ignition, and or pinging. The knock sensor 32 is shown communicatively coupled to a controller, (e.g., reciprocating device controller) engine control unit (ECU) 34. During operations, signals from the knock sensors 32 are communicated to the ECU 34 to determine if knocking conditions (e.g., pinging), or other behaviors exist. The ECU 34 may then adjust certain engine 12 parameters to ameliorate or avoid the undesirable conditions. For example, the ECU 34 may adjust ignition timing and/or adjust boost pressure to avoid knocking. As further described herein, the knock sensors 32 may additionally detect other vibrations beyond knocking. Although the following techniques for analyzing component health are discussed in terms of a combustion engine, the same techniques may be applied to other reciprocating devices, such as a compressor.

Figure 2:
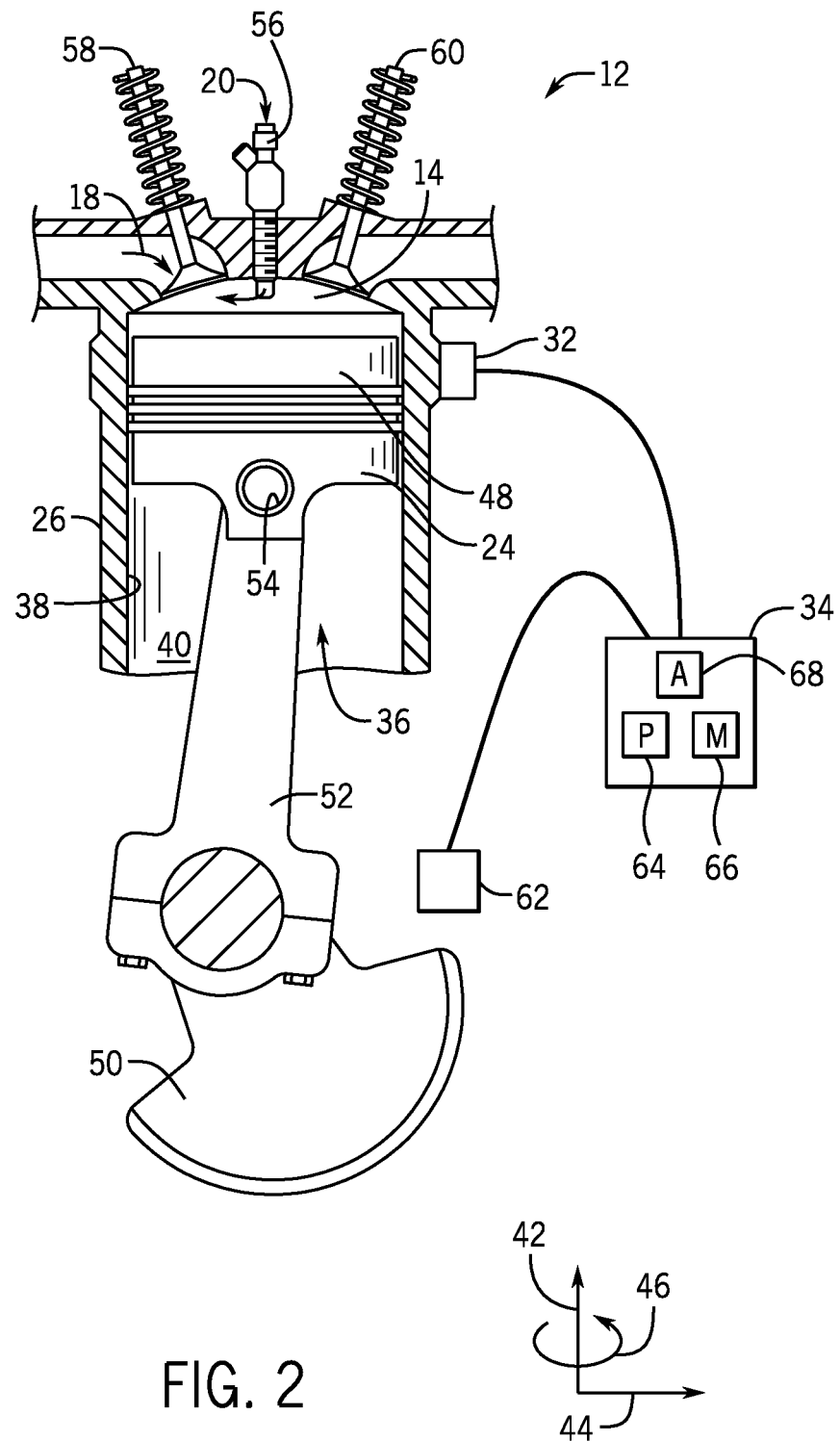
FIG. 2 is a side cross-sectional view of an embodiment of a piston assembly in accordance with aspects of the present disclosure.

FIG. 2 is a side cross-sectional view of an embodiment of a piston assembly 36 having a piston 24 disposed within a cylinder 26 (e.g., an engine cylinder) of the reciprocating engine 12. The cylinder 26 has an inner annular wall 38 defining a cylindrical cavity 40 (e.g., bore). The piston 24 may be defined by an axial axis or direction 42, a radial axis or direction 44, and a circumferential axis or direction 46. The piston 24 includes a top portion 48 (e.g., a top land). The top portion 48 generally blocks the fuel 20 and the air 18, or a fuel-air mixture, from escaping from the combustion chamber 14 during reciprocating motion of the piston 24.

As shown, the piston 24 is attached to a crankshaft 50 via a connecting rod 52 and a pin 54. The crankshaft 50 translates the reciprocating linear motion of the piston 24 into a rotating motion. As the piston 24 moves, the crankshaft 50 rotates to power the load 30 (shown in FIG. 1), as discussed above. As shown, the combustion chamber 14 is positioned adjacent to the top land 48 of the piston 24. A fuel injector 56 provides the fuel 20 to the combustion chamber 14, and an intake valve 58 controls the delivery of air 18 to the combustion chamber 14. An exhaust valve 60 controls discharge of exhaust from the engine 12. However, it should be understood that any suitable elements and/or techniques for providing fuel 20 and air 18 to the combustion chamber 14 and/or for discharging exhaust may be utilized, and in some embodiments, no fuel injection is used. In operation, combustion of the fuel 20 with the air 18 in the combustion chamber 14 cause the piston 24 to move in a reciprocating manner (e.g., back and forth) in the axial direction 42 within the cavity 40 of the cylinder 26.

During operation, when the piston 24 is at the highest point in the cylinder 26 it is in a position called top dead center (TDC). When the piston 24 is at its lowest point in the cylinder 26, it is in a position called bottom dead center (BDC). As the piston 24 moves from top to bottom or from bottom to top, the crankshaft 50 rotates one half of a revolution. Each movement of the piston 24 from top to bottom or from bottom to top is called a stroke, and engine 12 embodiments may include two-stroke engines, three-stroke engines, four-stroke engines, five-stroke engine, six-stroke engines, or more.

During engine 12 operations, a sequence including an intake process, a compression process, a power process, and an exhaust process typically occurs. The intake process enables a combustible mixture, such as fuel and air, to be pulled into the cylinder 26, thus the intake valve 58 is open and the exhaust valve 60 is closed. The compression process compresses the combustible mixture into a smaller space, so both the intake valve 58 and the exhaust valve 60 are closed. The power process ignites the compressed fuel-air mixture, which may include a spark ignition through a spark plug system, and/or a compression ignition through compression heat. The resulting pressure from combustion then forces the piston 24 to BDC. The exhaust process typically returns the piston 24 to TDC while keeping the exhaust valve 60 open. The exhaust process thus expels the spent fuel-air mixture through the exhaust valve 60. It is to be noted that more than one intake valve 58 and exhaust valve 60 may be used per cylinder 26.

The engine 12 may also include a crankshaft sensor 62, one or more knock sensors 32, and the engine control unit (ECU) 34, which may include a processor 64, memory 66 (e.g., non-transitory computer readable medium), and an amplifier 68. The crankshaft sensor 62 senses the position and/or rotational speed of the crankshaft 50. Accordingly, a crank angle or crank timing information may be derived. That is, when monitoring combustion engines, timing is frequently expressed in terms of crankshaft 50 angle. For example, a full cycle of a four stroke engine 12 may be measured as a 720° cycle. The one or more knock sensors 32 may be a Piezo-electric accelerometer, a microelectromechanical system (MEMS) sensor, a Hall effect sensor, a magnetostrictive sensor, and/or any other sensor designed to sense vibration, acceleration, sound, and/or movement. In other embodiments, sensor 32 may not be a knock sensor in the traditional sense, but any sensor that may sense vibration, pressure, acceleration, deflection, or movement.

Because of the percussive nature of the engine 12, the knock sensor 32 may be capable of detecting signatures even when mounted on the exterior of the cylinder 26. The one or more knock sensors 32 may be disposed at many different locations on the engine 12. For example, in FIG. 2, one knock sensor 32 is shown on the side of the cylinder 26. In other embodiments, one or more knock sensors 32 may be used on the head of the cylinder 26. Additionally, in some embodiments, a single knock sensor 32 may be shared, for example, with one or more adjacent cylinders 26. In other embodiments, each cylinder 26 may include one or more knock sensors 32 on either or both sides of a cylinder 26. The crankshaft sensor 62 and the knock sensor 32 are shown in electronic communication with the engine control unit (ECU) 34. The ECU 34 includes a processor 64, memory 66, and may also include an amplifier 68. The memory 66 may store non-transitory code or computer instructions that may be executed by the processor 64. The ECU 34 monitors and controls and operation of the engine 12, for example, by adjusting spark timing, valve 58, 60 timing, adjusting the delivery of fuel and oxidant (e.g., air), and so on. In some embodiment, the amplifier 68 may be utilized to amplify the knock sensor 32 signal. The amplifier 68 may be a hardware-based amplifier, a software-based amplifier, or a combination thereof. Amplification may be done in real time as the ECU 34 is recording data collected by the knock sensor 32, or as part of post-processing after data has been recorded by the ECU 34.

Knock sensors 32 are used to detect engine knock. Engine knock is the premature combustion of fuel outside the envelope of normal combustion. In some cases, the ECU 34 may attempt to reduce or avoid engine knock when it occurs by adjusting the operating parameters of the engine. For example, the ECU 34 may adjust the air/fuel mix, ignition timing, boost pressure, etc. in an effort to reduce or avoid engine knock. However, knock sensors may also be used to detect other vibrations in an engine unrelated to engine knock.

Figure 3:
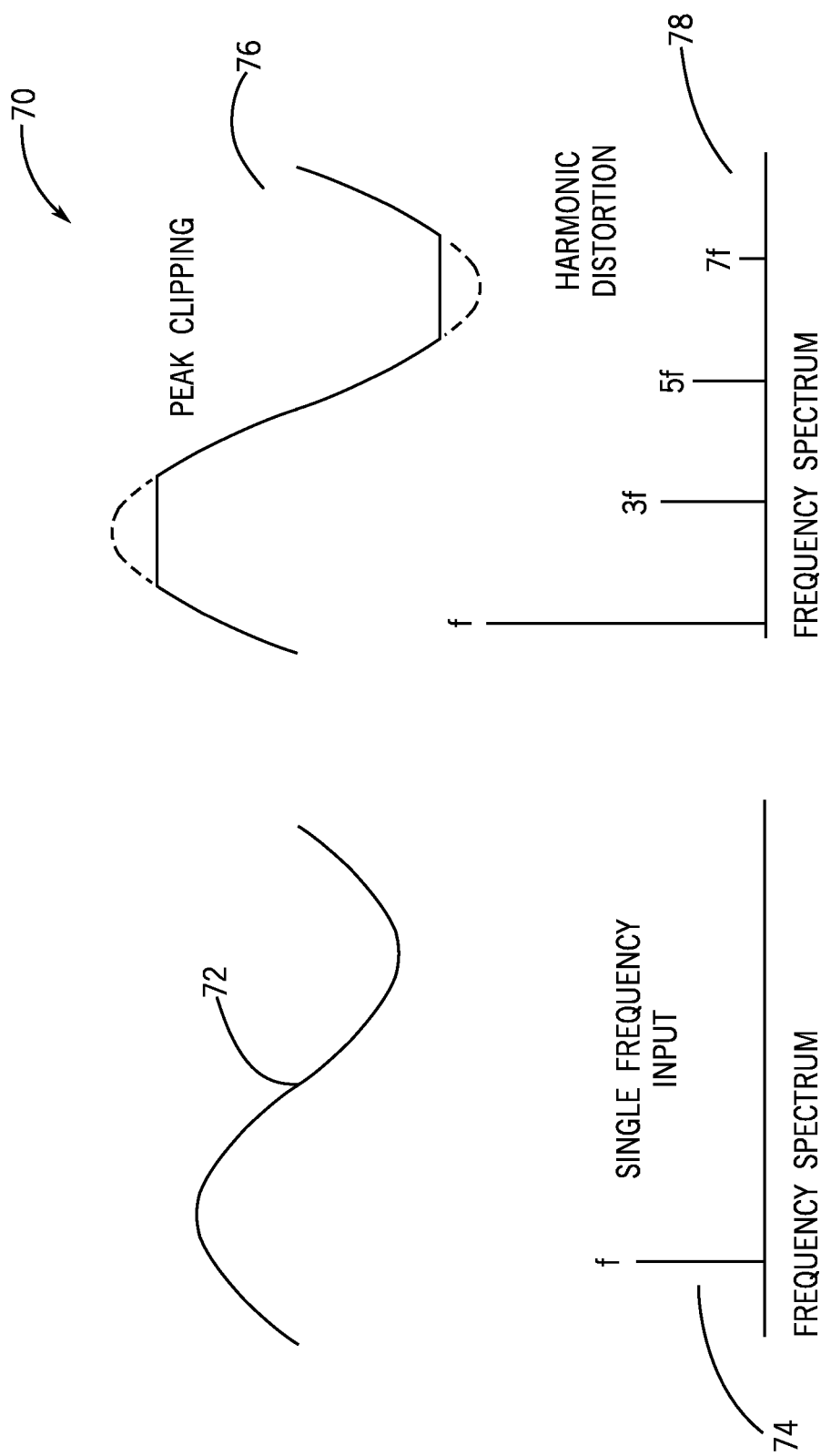
FIG. 3 is an illustration of how harmonic distortion affects a signal in accordance with aspects of the present disclosure.

FIG. 3 is an illustration 70 of how harmonic distortion affects a signal in accordance with aspects of the present disclosure. Signal 72 on the left is a sine wave signal of a single frequency, as shown by the frequency spectrum 74. When a component is healthy, the signal from the knock sensor will be dominated by one frequency, the fundamental frequency of the component in question. As a part wears, the harmonic distortion of the signal detected by the knock sensor 32 will increase as resonance of the harmonic frequencies become more prevalent. The distorted signal 76 and the frequency spectrum 78 show how harmonic overtones, in this case at the third, fifth, and seventh harmonics, result in clipping of the signal 76. In general, as the overtones at the odd harmonics increase, the signal 76 experiences clipping and approaches a square wave. It should be understood, however, that FIG. 3 is merely used as an example to show how harmonic overtones and clipping are related. The disclosed embodiments may include different levels of harmonic distortion, and/or different combinations of harmonics resonating. Similarly, the signals detected by the knock sensor 32 may not look anything like the signals 72, 76 shown in FIG. 3. For the sake of simplicity, the signals 72, 76 shown in FIG. 3 use a sine wave. Additionally, though signal 72 shows a sine wave signal having a single frequency, it should be understood that even a brand new component may have some amount of harmonic distortion. As such, one skilled in the art should not expect a healthy component to only resonate at a single frequency.

Figure 4:
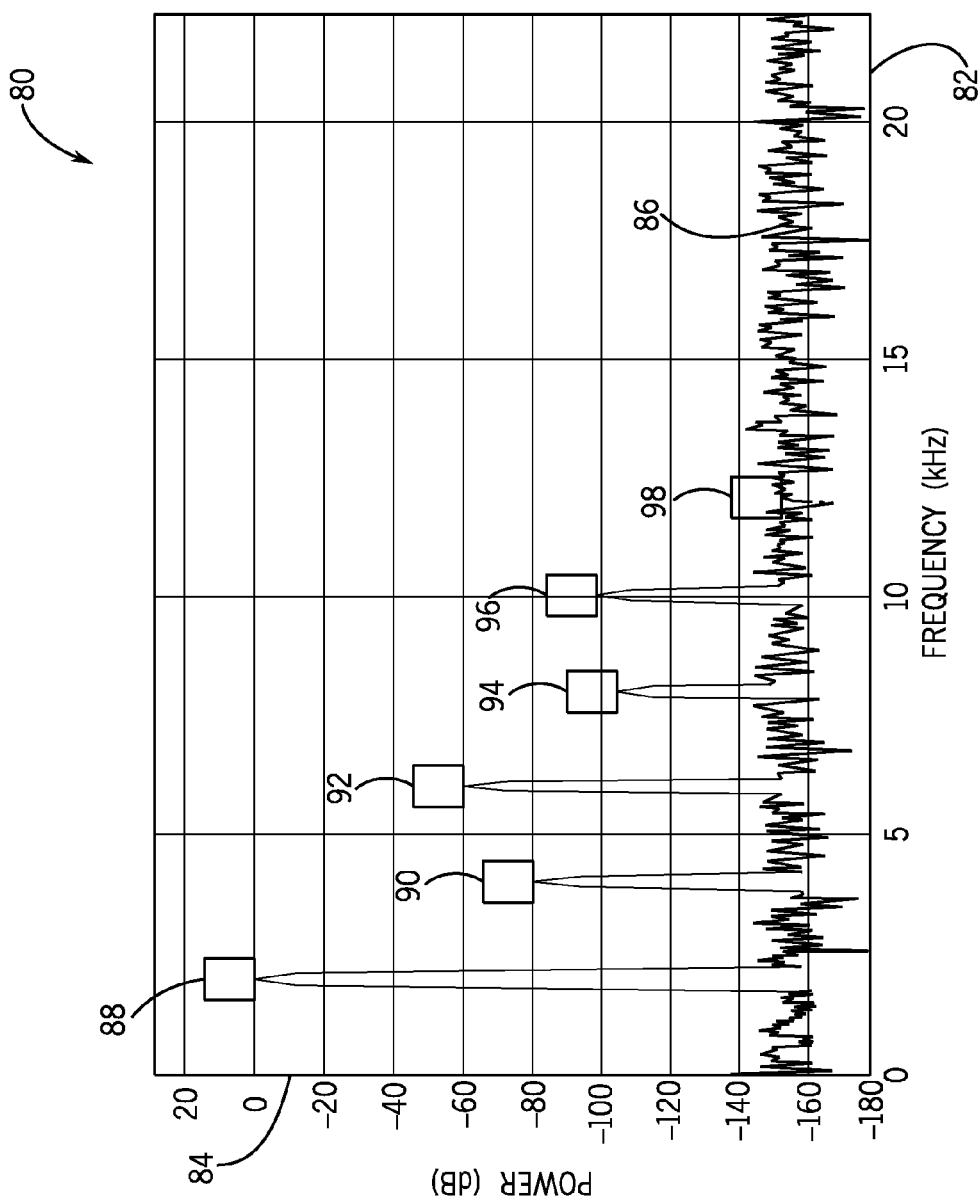
FIG. 4 is an embodiment of a sample spectrum plot of a signal with harmonic distortion in accordance with aspects of the present disclosure.

FIG. 4 is an embodiment of a sample spectrum plot 80 of a component signal 86 with harmonic distortion sampled from a knock sensor 32. The x-axis 82 of plot 80 is frequency in kilohertz (kHz). The y-axis 84 of plot 80 is power in decibels (dB). It should be understood, however, that in other embodiments, the y-axis may be volts, raw noise amplitude, engineering units, or some other unit. The component being monitored may be any component of the engine. For example, the component may be the piston 24, cylinder 26, shaft 28, connecting rod 52, pin 54, parts of the valves 58, 60, or any other component in the engine. The component signal 86 shows peaks at the fundamental frequency 88 (i.e., the first harmonic), the second harmonic frequency 90, the third harmonic frequency 92, the fourth harmonic frequency 94, and the fifth harmonic frequency 96. Though the sixth harmonic frequency 98 is shown, there is not a noticeable peak at the sixth harmonic frequency 86 in the plot 80. Though a spectrum plot of a component signal would look something like this, it should be understood that depending upon the fundamental frequency 88 of the component and the health of the component, the plot may look very different, perhaps with a different number of peaks, different peak amplitudes, peaks in different places, etc.

Figure 5:
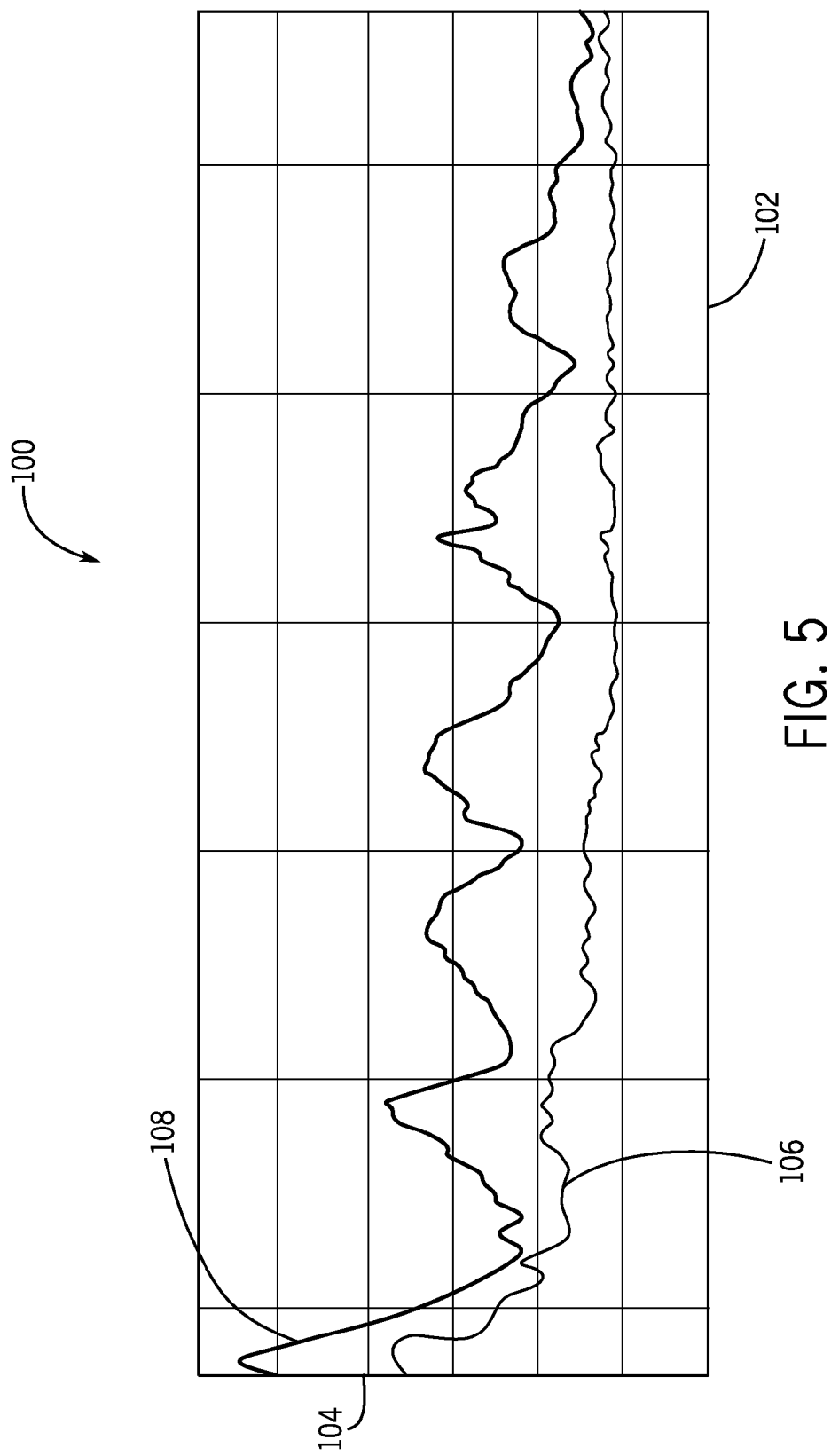
FIG. 5 is an embodiment of a sample spectrum plot showing signals from healthy and worn components in accordance with aspects of the present disclosure.

FIG. 5 is an embodiment of a sample spectrum plot 100 of a piston assembly 36 showing piston slap and a healthy piston assembly 36. As with the plot 80 in FIG. 4, the x-axis 102 of plot 80 is frequency in kHz. The y-axis 104 is the noise amplitude and may be in many different units including dB, volts, engineering units, etc. Signal 106 is the signal of a relatively healthy piston assembly 36. Note the lack of large peaks at the harmonic frequencies as the frequency increases. In contrast, signal 108 is from a cylinder 24 with an unhealthy piston assembly 36 experiencing piston slap. Signal 108 displays large peaks at harmonic frequencies along the spectrum, indicating an unhealthy component. Piston slap occurs when the clearance between the piston 24 and the cylinder 26 is too large, resulting in excessive play between the piston 24 and the cylinder 26. When piston slap is present, the piston 24 rubs against one side of the cylinder 26 during combustion and applies a thrust to one side of the cylinder 76 (called the "thrust face"). Piston slap may be caused by a poor fit between the piston 24 and the cylinder 26, or by worn components. For example, piston slap may be present before pin or rod failure. By catching the problem before the component actually fails, the operator may be able to shut down the engine before the part fails, thus preventing potentially costly damage to the other engine components. As with FIG. 4, it should be understood that depending upon the fundamental frequency of the component and the health of the components, the spectrum plot of a component may look very different, perhaps with a different number of peaks, different peak amplitudes, peaks in different places, etc.

Figure 6:
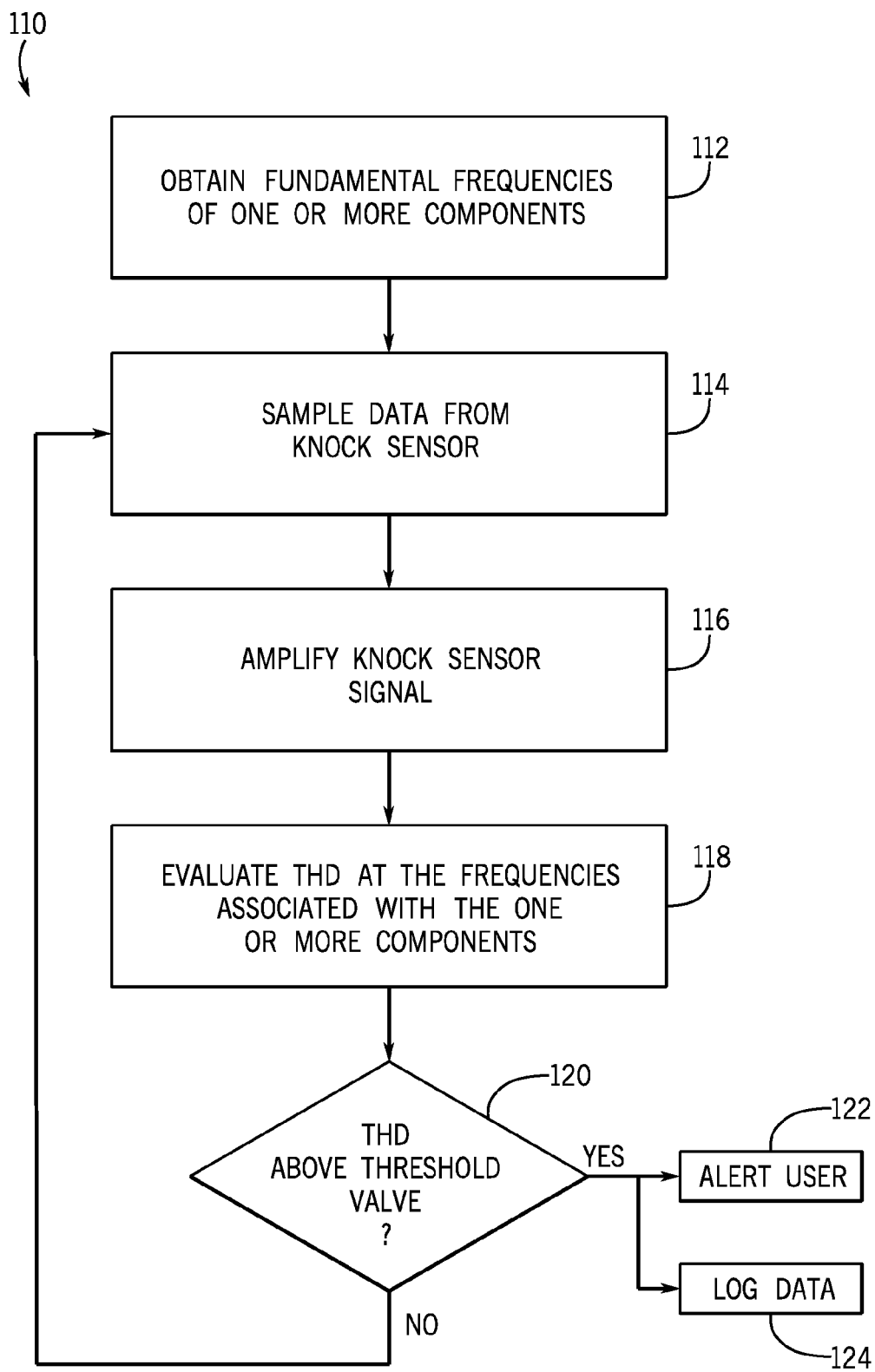
FIG. 6 is a flow chart showing an embodiment of a process for determining the health of one or more engine components using total harmonic distortion in a knock sensor signal in accordance with aspects of the present disclosure.

FIG. 6 is a flow chart showing an embodiment of a process 110 for determining the health of one or more engine components by calculating the total harmonic distortion in a knock sensor 32 signal. The process 110 may be implemented as computer instructions or executable code stored in the memory 66 and executable by the processor 64 of the ECU 34. In block 112, the process 110 obtains (e.g., receives, from a user or another device, accesses from memory 66, or some other method) the fundamental frequencies of one or more engine components. A table showing harmonic frequencies for multiple components is shown below in Table 1.

26. In still other embodiments, more than one cylinder 26 may share a knock sensor 32.

In block 116, the process 110 may amplify the signal from the knock sensor 32 using an amplifier 68. As discussed with regard to FIG. 3, harmonic distortion may be present when a signal is clipped. In some embodiments, the signal from knock sensor 32 may be faint or weak, such that harmonic distortion is not readily discernible. In such cases, the process 110 may amplify the signal using an amplifier 68. The amplifier 68 may be hardware-based or software-based. In some embodiments, the process 110 amplifies the signal. The level of amplification (if amplification is needed at all) should be such that normal excitation of the component under analysis is under the clipping point, but under abnormal excitation (i.e., component wear or failure), the signal reaches the clipping point. Once clipping occurs, the total harmonic distortion measurement can be utilized to detect this point. It should be understand that not all embodiments may utilize an amplifier 68. If the unamplified signal from the knock sensor 32 is such that the signal is under the clipping point during normal excitation, but reaches the clipping point during abnormal excitation, the signal may not be amplified.

In block 118, the process 110 evaluates the total harmonic distortion (THD) or total harmonic distortion plus noise (THD+N) at the frequencies associated with the various components in question to determine whether the THD or THD+N is greater than a threshold value. The threshold value may be expressed as a percentage or in decibels (dB) relative to the fundamental frequency. The threshold may be input by a user, obtained from another device, or received by some other method, stored in memory 66, and accessible by the processor 64. As a part wears or otherwise nears failure,

TABLE 1

Example of Component Frequencies

| Frequencies of Interest | ¼ Harmonic (Hz) | ⅓ Harmonic (Hz) | ½ Harmonic (Hz) | $2^{nd}$ Harmonic (Hz) | $3^{rd}$ Harmonic (Hz) | $4^{th}$ Harmonic (Hz) |
|---|---|---|---|---|---|---|
| Component A (13000 Hz) | 3250 | 4333 | 6500 | 26000 | 39000 | 52000 |
| Component B (1875 Hz) | 467 | 625 | 938 | 3750 | 5625 | 7500 |
| Component C (5900 Hz) | 1475 | 1967 | 2950 | 11800 | 17700 | 23600 |
| Component D (3840 Hz) | 960 | 1280 | 1920 | 7680 | 11520 | 15360 |

The left column of Table 1 lists four components and their fundamental frequencies, each component having its own row. Table 1 lists the various harmonic frequencies for the components listed in each row. Table 1 includes harmonics less than and greater than the fundamental frequency (i.e., fractional harmonics and integer harmonics). However, it should be understood that Table 1 is merely an example. Some embodiments may include more or fewer components, while other embodiments may include harmonic frequencies not shown in Table 1 (e.g., ⅛ harmonic, fifth harmonic, etc.). In use, the user may enter the fundamental frequencies of the components along with the harmonics that are of interest (e.g., ¼, ½, 1, 2, 3, 4, etc.), or simply the fundamental frequency of the components. In other embodiments, the frequencies may be obtained from another device, obtained remotely, or stored in memory 66.

In block 114, the process 110 samples data received from the knock sensor 32. For example, the one or more knock sensors 32 collect data and then transmit the data to the ECU 34. In the present embodiment, a single knock sensor 32 is mounted on each cylinder 26. In other embodiments, two or more knock sensors 32 may be mounted on a single cylinder the total THD will increase. That is, as a part wears, the resonance of that part during operation becomes less dominated by resonance at the fundamental frequency of the part, and more dominated by resonance at the harmonic frequencies. THD may be calculated using the following equation:

$$THD = \frac{\sqrt{V_2^2 + V_3^2 + V_4^2 + \ldots + V_n^2}}{V_1}, \quad (1)$$

wherein THD is the total harmonic distortion, $V_n$ is the RMS voltage of the $n^{th}$ harmonic, and $V_1$ is the fundamental frequency of the component in question.

THD+N may be calculated using the following equation:

$$THD + N = \frac{\sum_{n=2}^{\infty} \text{harmonics} + \text{noise}}{\text{fundamental}} \quad (2)$$

In decision 120, the process 110 determines whether the THD or THD+N is above a provided threshold value. If the THD or THD+N is above the threshold value, one or more components in the engine 12 may be wearing out, worn, or close to failure. If the THD (or THD+N) is above the threshold value, then the process 110 moves to block 122 and alerts the user that the THD or THD+N is above the threshold level and the component may be approaching failure. The user may be alerted in a number of different ways, including proprietary error codes, via a display, sounds or audio notifications, via text, or some other user-perceptible indication that the THD exceeds the threshold value. In some embodiments the ECU 34 may shift into another mode of operation (e.g., safe run mode) that reduces the likelihood of component failure causing excessive damage. The user may then decide whether or not to shut down the engine 12 and investigate the problem further. Additionally, in block 124, the process 110 may log the collected data for future analysis. If the THD (or THD+N) is less than the threshold value, the process 110 returns to block 114 and samples more data from the knock sensor 32.

Technical effects of the disclosed embodiments include systems and methods of deriving reciprocating device component health which may include obtaining the respective fundamental frequencies of one or more engine components, the harmonics of interest associated with each fundamental frequency, and/or a threshold distortion level, receiving a signal from a knock sensor coupled to a reciprocating device, amplifying the signal, deriving total harmonic distortion (THD) or total harmonic distortion plus noise (THD+N) at one or more of the frequencies, determining whether the derived THD exceeds a threshold value, and alerting the user that a component may be nearing failure.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of deriving reciprocating device component health comprising:
    utilizing a controller for:
        receiving a signal from a knock sensor coupled to a reciprocating device;
        deriving a first total harmonic distortion (THD) of the signal at a first fundamental frequency of a first reciprocating device component;
        determining whether the derived first THD exceeds a first threshold value;
        deriving a second THD of the signal at a second fundamental frequency of a second reciprocating device component; and
        determining whether the derived second THD exceeds a second threshold value.

2. The method of claim 1, further comprising obtaining the first and second fundamental frequencies.

3. The method of claim 1, further comprising obtaining the first and second threshold values.

4. The method of claim 1, further comprising amplifying the signal, via an amplifier, such that signal clipping does not occur under normal excitation, but signal clipping does occur under abnormal excitation, wherein abnormal excitation corresponds to the first or second reciprocating device component wearing out or nearing failure.

5. The method of claim 4, wherein the amplifier is hardware-based.

6. The method of claim 4, wherein the amplifier is software-based.

7. The method of claim 1, wherein deriving the first and second THD comprises calculating THD plus noise (THD+N) at the first and second fundamental frequencies.

8. The method of claim 1, wherein deriving the first and second THD comprises evaluating an amplitude of the signal at frequencies comprising one-fourth, one-third, one-half, second, third, and fourth harmonic frequencies of the first and second fundamental frequencies.

9. The method of claim 1, further comprising providing a user perceptible indication of the first and second THD exceeding the first and second threshold value.

10. A system comprising:
    a reciprocating device controller configured to control a reciprocating device, wherein the reciprocating device controller comprises a processor configured to:
        obtain first and second fundamental frequencies of first and second reciprocating device components;
        receive a signal from a knock sensor coupled to the reciprocating device;
        derive a first total harmonic distortion (THD) of the signal at the first fundamental frequency of the first reciprocating device component;
        determine whether the derived first THD exceeds a first threshold value;
        derive a second THD of the signal at the second fundamental frequency of the second reciprocating device component; and
        determine whether the derived second THD exceeds a second threshold value.

11. The system of claim 10, wherein the reciprocating device controller further comprises an amplifier configured to amplify the signal.

12. The system of claim 11, wherein the amplifier is further configured to amplify the signal such that signal clipping does not occur under normal excitation, but signal clipping does occur under abnormal excitation, wherein abnormal excitation corresponds to the first or second reciprocating device components wearing out or nearing failure.

13. The system of claim 10, wherein deriving the first and second THD comprises calculating the THD plus noise (THD+N) at the first and second fundamental frequencies.

14. The system of claim 10, wherein the processor is further configured to obtain the first and second threshold values.

15. The system of claim 10, wherein deriving the first and second THD comprises evaluating an amplitude of the signal at the one-fourth, one-third, one-half, second, third, and fourth harmonic frequencies of the first and second fundamental frequencies.

16. A non-transitory computer readable medium comprising executable instructions that when executed cause a processor to:
    obtain first and second fundamental frequencies of first and second reciprocating device components;
    receive a signal from a knock sensor coupled to the reciprocating device;
    derive a first total harmonic distortion (THD) of the signal at the first fundamental frequency of the first reciprocating device component;

determine whether the derived first THD exceeds a first threshold value;

derive a second THD of the signal at the second fundamental frequency of the second reciprocating device component;

determine whether the derived second THD exceeds a second threshold value; and provide a user perceptible indication of the presence of distortion.

17. The non-transitory computer readable medium of claim 16, wherein deriving the first and second THD comprises evaluating an amplitude of the signal at the one-fourth, one-third, one-half, second, third, and fourth harmonic frequencies of the first and second fundamental frequencies.

18. The non-transitory computer readable medium of claim 16, wherein the processor is further configured to amplify the signal such that signal clipping does not occur under normal excitation, but signal clipping does occur under abnormal excitation, wherein abnormal excitation corresponds to the first or second reciprocating device component wearing out or nearing failure.

19. The non-transitory computer readable medium of claim 16, wherein deriving the first and second THD comprises calculating the THD plus noise (THD+N) at the first and second fundamental frequencies.

* * * * *